F. P. FAHY.
METHOD OF AND APPARATUS FOR TESTING MAGNETIC OBJECTS.
APPLICATION FILED SEPT. 23, 1912.
1,223,377.
Patented Apr. 24, 1917.
2 SHEETS—SHEET 1.
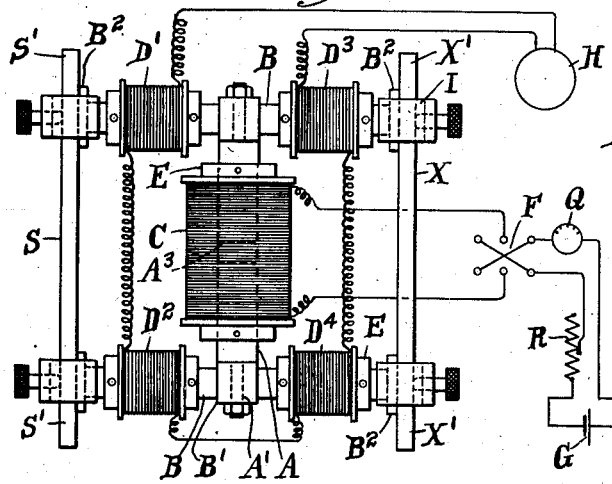
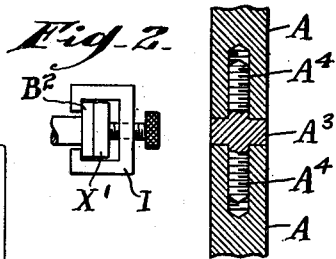
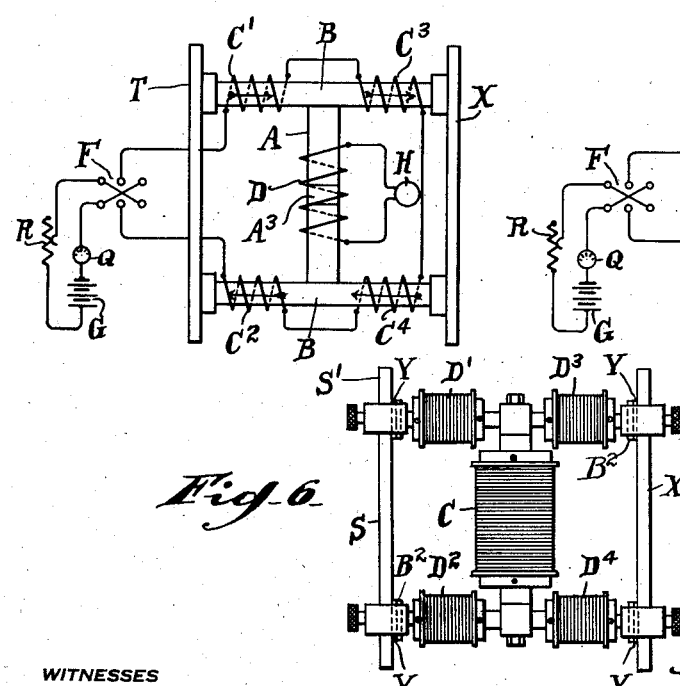
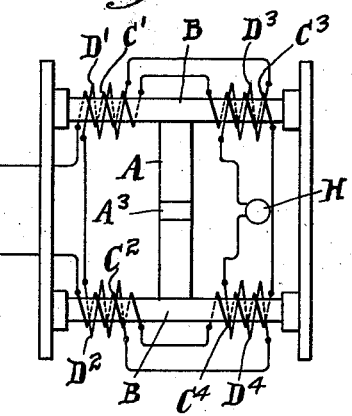
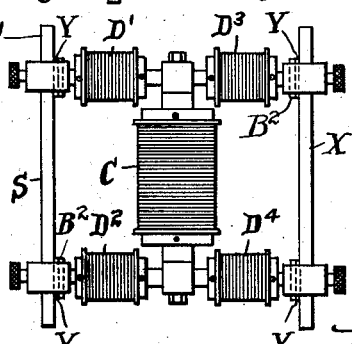

F. P. FAHY.
METHOD OF AND APPARATUS FOR TESTING MAGNETIC OBJECTS.
APPLICATION FILED SEPT. 23, 1912.

1,223,377.

Patented Apr. 24, 1917.
2 SHEETS—SHEET 2.

WITNESSES

INVENTOR
Frank P. Fahy
BY
his ATTORNEY

UNITED STATES PATENT OFFICE.

FRANK P. FAHY, OF WASHINGTON, DISTRICT OF COLUMBIA.

METHOD OF AND APPARATUS FOR TESTING MAGNETIC OBJECTS.

1,223,377. Specification of Letters Patent. Patented Apr. 24, 1917.

Application filed September 23, 1912. Serial No. 721,823.

*To all whom it may concern:*

Be it known that I, FRANK P. FAHY, a citizen of the United States of America, residing in Washington, District of Columbia, have invented a certain new and useful Improvement in Methods of and Apparatus for Testing Magnetic Objects, of which the following is a true and exact description, reference being had to the accompanying drawings, which form a part thereof.

The primary object of the invention is to provide a practical and effective method of determining certain relations between the magnetic characteristics of metallic bodies and the physical and mechanical properties of the bodies.

Among the mechanical properties of a metal object, and particularly of an iron or steel object which may be determined more or less exactly from a knowledge of the magnetic characteristics of the object are its elasticity, tenacity and ductility and that somewhat indefinite property called hardness. These properties are primarily inherent in the object in degree according to its chemical nature, but are affected in practice by the presence of blow-holes, laminations, segregation, cracks or strains which may be formed in the manufacture of the object, and which, to a certain extent, correspondingly affect the magnetic characteristics of the object. The mechanical properties of the object may be altered also by processes of heat treatment or cold working during manufacture or use, with a consequent variation in the magnetic characteristics of the object.

The magnetic characteristics of such an object as well as its mechanical properties are determined largely by its chemical composition and in practice the magnetic characteristics of the object are dependent to a considerable degree upon the shape of the object, and one of the important objects of the present invention is to practically eliminate errors due to variations in shape and in the basic chemical composition of the specimen objects compared or tested.

One of the important uses of my invention is the determination of the magnetic characteristics of a metallic object, or its mechanical properties of which its magnetical characteristics furnish a measure, when the object has been subjected to certain prescribed heat treatment, or has been cold or hot worked in a certain manner. In the practical use of my invention for this purpose I prefer to compare the magnetic characteristics of the object to be tested with the magnetic characteristics of an object which is of the same or practically the same shape and of substantially the same basic chemical composition and which has had imparted to it a definite or standard treatment. To insure the same basic chemical composition, I prefer in many cases to form the standard piece out of the same bar of metal from which the piece to be tested was formed, or at least, out of a bar of metal from the same "heat". Preferably the standard treatment to which the standard piece is subjected includes a thorough annealing as a final step following the shaping of the piece. The annealed piece and the test piece will then have what I call the same basic chemical composition although there may be an actual difference of composition or phase due to the difference in treatments to which the standard and test pieces have been subjected. In general however, the difference in composition or phase thus produced is a function of the difference in the magnetic characteristics and mechanical properties of the two pieces. For instance, when the object to be tested is a hardened steel spring, the difference in chemical composition or phase between the annealed standard piece and the tempered, case hardened, or otherwise hardened test piece, will result in a difference in the magnetic characteristics of the two pieces which is itself a function or measure of the temper or hardness of the test specimen.

In testing objects such as tempered steel springs which are to be tested in large numbers and are manufactured under such conditions that they do not differ from each other in basic chemical composition except through a small range, I sometimes employ as a standard piece one having a basic chemical composition which is a fair average of the composition of the different objects to be tested.

The apparatus which I prefer to employ in carrying out the present invention comprises a stationary core of magnetic material which may be laminated or unlaminated, depending upon conditions of use. This core is shaped to provide two similar magnetic circuits, each including an individual air gap and a core portion common to both circuits. The air gap in one circuit is adapted to be bridged by the standard piece and the other air gap by the piece to be tested. Associated with the core of the apparatus are provisions for subjecting each branch circuit to the same magneto-motive force and for inductively comparing the magnetic effects produced thereby in the two branch circuits. This apparatus is characterized by its inherent simplicity and effectiveness and by the provisions made for subjecting the standard and test pieces to substantially identical magnetic potential differences in successive testing operations of the same character.

The means employed in practice for subjecting the two branches of the magnetic circuit to similar magnetizing forces and for obtaining a measure of the flux variations produced thereby in the two magnetic circuits, comprise a magnetizing winding connected to a suitable extraneous source of electro-motive force, and an induced current winding having its terminals connected to a suitable galvanometer, or other indicating instrument. One or the other of these two windings must include two portions, one applied in inductive relation to one, and the other in inductive relation to the second of the two separate branches of the magnetic core. The second of the two windings may include portions applied partly to one and partly to the other of the two branches of the magnetic core, or may wholly be applied to the common portion of the core.

Instead of employing the apparatus referred to above in a direct comparison of standard and test pieces simultaneously bridging one the one and the other the second of the two air gaps of the branched magnetic circuit the standard and test pieces may be successively applied to one of the air gaps while the other is left unbridged. In such a use of the apparatus a comparison of the readings obtained when the standard and test pieces are separately employed to bridge one of the air gaps of the apparatus will furnish an indication of the difference between their magnetic characteristics, and when the apparatus has once been calibrated, so to speak, by the use of readings obtained with a standard piece, or in some other manner, the readings obtained with a test piece of known shape and size will of themselves furnish an indication of the magnetic characteristics of the pieces tested.

The simultaneous use of standard and test pieces possessing about the same magnetic characteristics possesses the important practical advantage of increasing the sensitiveness of the apparatus, since the quantity then required to be measured by the galvanometer or other indicating instrument may be the integrated electromotive force due to the differential of the flux variations in the two separate magnetic circuits. Where the standard and test pieces differ slightly in cross section, this variation in cross section may be compensated for by correspondingly varying the number of turns in different portions of the winding applied in part to one and in part to the other of the separate branches of the magnetic circuit.

Practically the same sensitiveness may be imparted to the apparatus, however, when the test piece bridges one air gap and the other air gap is left unbridged by impressing a known integrated counter electromotive force on the induced current circuit to thereby minimize the quantity directly measured by the galvanometer or other indicating instrument employed.

The various features of novelty which characterize my invention are pointed out with particularity in the claims annexed to and forming a part of this specification. For a better understanding of the invention, however, and its specific objects and the advantages possessed by it, reference should be had to the accompanying drawings and descriptive matter, in which I have illustrated and described in detail various embodiments of the invention claimed, and apparatus by which it may be advantageously carried out.

Of the drawings,

Figure 1 is a plan view of one form of apparatus which I may employ with circuit connections thereto diagrammatically illustrated.

Fig. 2 is an elevation of a portion of the apparatus shown in Fig. 1.

Fig. 3 is a sectional view of another portion of the apparatus shown in Fig. 1.

Fig. 4 is a diagrammatic representation of apparatus differing from that shown in Fig. 1 in the arrangement of the windings.

Fig. 5 is a view similar to Fig. 4 illustrating a third arrangement of the windings which may be employed.

Figure 7:
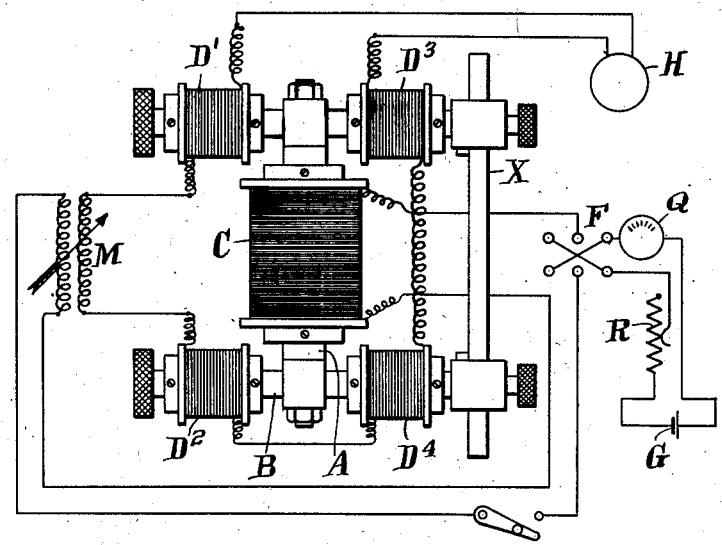
Figure 8:
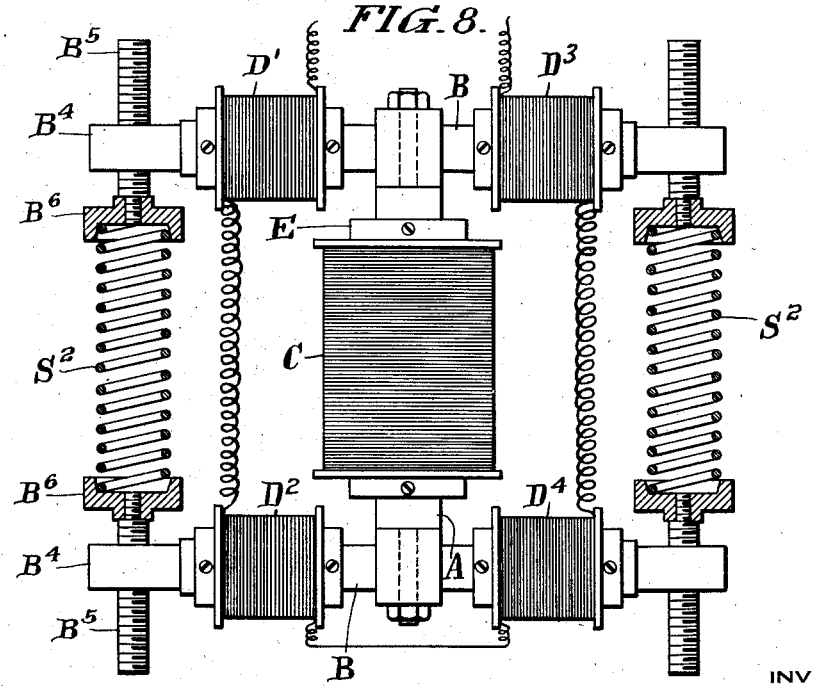

Figs. 6 to 8 inclusive are views taken similarly to Fig. 1, and each illustrating a different modification or use of the apparatus shown by Fig. 1, as follows:

Fig. 6 illustrates the use of non-magnetic spacers between the core of the apparatus and the standard and test pieces.

Fig. 7 illustrates the use of a mutual inductance winding to compensate for the removal of the standard piece; and Fig. 8 illustrates the use of special pole pieces for testing helical springs.

In the drawings and referring first to the construction shown in Figs. 1, 2, and 3, the apparatus comprises a magnetic core of H-shape, A representing the cross-bar of the core and B, B the legs. As shown, the cross-bar A is cylindrical in form and is provided with threaded extensions A' which pass through the squared central portions B' of the legs B, B which are shown as having cylindrical bodies. The ends of the core legs B, B are provided with suitable pole pieces $B^2$, $B^2$, the form of which depends upon the shape and character of the articles to be tested and compared. As shown in Figs. 1 and 2, the pole pieces B² are in the form of disks provided with threaded extensions screwed into the ends of the legs B, B. One of the two articles to be tested or compared, the piece S for instance, which may be regarded as the standard piece, is placed against the two pole pieces B² at the left of the cross-bar A, and the article X is placed against the two pole pieces B² at the right of the cross-bar. In Figs. 1 and 2 the provisions shown for securing the pieces S and X against the pole pieces comprise yokes I, preferably of non-magnetic material, fitted one over each pole piece, as clearly shown in Fig. 2, each yoke being provided with a clamping screw, also preferably of non-magnetic material, by means of which the article inclosed by the yoke and pole piece may be pressed against the latter. I may explain at this point that the force with which the article to be tested or compared is pressed against the pole piece does not seem to be of importance, provided that it is sufficient to insure the contact desired.

In the use of this apparatus each magnetic circuit, including the standard or test piece, the common core portion A and the corresponding pole piece B² and the portions of the core legs B, is subjected to the same magnetizing force and the relative inductive effects of the resulting magnetic fluxes in the two branches are determined. In the simple and effective arrangement illustrated in Fig. 1 for accomplishing this magnetization and determination of the consequent flux variations, a magnetizing coil C is symmetrically disposed upon the cross-bar A and, as shown, is secured against endwise displacement by collars E at the ends of the coil, secured to the cross-bar A by set screws. The terminals of the coil are connected to the terminals of a reversing switch F by means of which the coil may be energized alternately in opposite directions from a source of current indicated conventionally as a battery G. Q represents an ammeter, and R, a suitable adjustable resistance in the energizing circuit. D', D², D³, and D⁴ represent similar test coils placed one upon each of the two branches of the two core legs B at each side of the cross-bar A. These test coils are connected together in series with each other and with a suitable measuring or indicating device H. The most satisfactory indicating device H which I have found for practical purposes is a ballistic galvanometer having a time constant of a second or upward, but it will be understood that other forms of electrical measuring instruments may be employed, and in particular that an alternating current instrument must be employed when the coil C is connected to a source of alternating current.

The coils D' and D² surrounding the portions of the two core legs B in series with the standard piece S are so connected with respect to each other and to the coils D³ and D⁴ that the electro-motive force generated in the coils D' and D² upon a change in the magnetic flux through the cross piece A opposes an electro-motive force generated at the same time in the coils D³ and D⁴. When the magnetic characteristics of the pieces S and X to be compared are alike and the connections between these pieces and the testing apparatus are similar, as they should be, the integrated electro-motive force generated in the coils D' and D² upon changes in the magnetizing force of the coil C are thus exactly neutralized by the corresponding integrated electro-motive force generated in the coils D³ and D⁴ and the needle of the ballistic galvanometer or other measuring device remains stationary. When the magnetic characteristics of the pieces S and X differ so that the flux change in portions of the core portions surrounded by the coils D' and D² is different from the flux change in the core portions surrounded by the coils D³ and D⁴ the needle of the indicating device will be deflected on a change in the magnetizing force of the coil C. The direction of needle deflection and its extent will be dependent, of course, upon the difference between the flux changes in the two branches of the magnetic circuit, and will be an accurate measure, as I have found of a difference in a common mechanical property as the hardness for instance of the two articles compared, when these two articles differ from each other only in a manner affecting this property.

In the usual operation of the apparatus, after the standard and test pieces are put in place the current in the coil C, which has been adjusted to give the desired magnetomotive force, is reversed in direction several times so as to bring the standard and test pieces into a cyclic state magnetically. Then a reading of the deflection of the measuring instrument due to one reversal is taken. This reading, when the constant of the apparatus is known, furnishes an accurate indication of the mechanical properties of the object being tested.

It is desirable for accurate work to keep the magnetizing current flow through the coil C fairly constant. This involves the use of the ammeter Q and adjustments of the resistance R in the particular apparatus shown. However, since a variation in the strength of the magnetizing current will under certain conditions of flux affect both the standard and test pieces to a practically equal extent, it is one of the advantages of my invention that a close adjustment of the magnetizing current is unnecessary. Instead of employing a battery G, Fig. 1, as a source of magnetizing current, a commercial lighting or power circuit may be employed as a source, even when the voltage of such a circuit fluctuates considerably.

When particularly accurate results are desired, the results obtained with one setting of the apparatus may be checked by interchanging the standard and test pieces and taking another set of readings. This tends to eliminate errors due to imperfect pole piece contact. I have already pointed out that there should be substantial identity in shape between the standard and test pieces, but this is to be understood as necessarily applying only to the portions of the pieces between and in proximity to the pole pieces. It will be apparent that the shape and indeed the composition of the portions S and X of the standard and test pieces extending away from the outer sides or ends of the pole pieces $B^2$ in any setting of the apparatus, affect the readings obtained only by virtue of the magnetic leakage from the portions. Leakage sufficient to affect the results obtained will take place from those portions only of the projecting ends S' and X' which are in immediate proximity to the pole pieces $B^2$, and if comparatively short portions of the projecting ends of the standard piece adjacent the pole pieces are similar to the corresponding portions of the test piece, differences in the outer portions of the projecting ends of the standard and test pieces become unimportant.

By proceeding in the preferred manner described, the following important and valuable results are obtained: Errors due to basic chemical differences between the standard and test pieces are avoided; errors due to differences of size and shape between the standard and test pieces are avoided. An accurate indication is obtained of the difference in the magnetic characteristics and mechanical properties dependent thereon or varying therewith in the test piece and a standard piece differing from it only in that it has been annealed to bring it into a certain definite condition.

It is customary in determining the magnetic characteristics of objects by tests made by an absolute testing method to make them under definite fixed temperature conditions. With the above described method of comparison the temperature effect tends to become unimportant, as both the standard and test pieces are affected to practically an equal extent by changes in temperature above or below that used ordinarily in making tests by absolute methods.

In place of the coil arrangement shown in Fig. 1, other arrangements of the magnetizing and test coils may be employed. For instance, in Fig. 4, the magnetizing coil C of Fig. 1 is replaced by four similar magnetizing coils $C'$ $C^2$, $C^3$, $C^4$ connected in series, and located one upon each of the two branches of the core legs B at each side of the cross-bar A, and the test coils $D'$, $D^2$, $D^3$, and $D^4$ of Fig. 1 are replaced by a single test coil D symmetrically disposed upon the cross-bar A and connected to the ballistic galvanometer or other measuring device H. The magnetizing coils $C'$, $C^2$, $C^3$, and $C^4$ are connected in such manner, that they develop in the magnetic circuit a flux which is closed upon itself as indicated by the arrows.

When the flux change in the pieces S and X is the same, upon a change in the magnetizing force of the coils $C'$, $C^2$, $C^3$, $C^4$, no flux passes through the common core portion A, since the magnetic potential difference between the ends of the cross-bar A is zero. When the flux change in the pieces S and X differs, however, a flux will pass through the core portion A, since no longer will there be a zero potential difference between the ends of the core portion A, and the needle indicating device will be deflected. The direction of needle deflection and its extent will be dependent, of course, upon the difference of the flux changes in the two branches of the magnetic circuit.

Another example of an arrangement of the magnetizing and induced current windings is shown in Fig. 5 wherein the coils $C'$, $C^2$, $C^3$ and $C^4$ arranged as in Fig. 4 are surrounded respectively by coils $D'$, $D^2$, $D^3$ and $D^4$, arranged on the core arms and connected up as in Fig. 1.

I prefer to form the magnetic core of the apparatus with a definite gap or gaps symmetrically disposed with respect to the branch circuits. For instance, as shown in Figs. 1 and 3, I divide the core section A at its center and space the divided sections a definite distance apart by a spacer $A^3$ of suitable non-magnetic material such as brass. The spacer $A^3$ is formed with threaded extensions $A^4$ mechanically connecting the two parts of the core portion A. By providing a high reluctance gap or gaps in the magnetic core of the apparatus, a number of important advantages are obtained. One of these arises from the fact that since the major portion of the reluctance of the magnetic circuit as a whole, when both test and standard pieces are on, is then found in such gap or gaps, the tendency of the gap or gaps is to maintain a practically constant magnetomotive force drop between the ends of the common core portion, and any ordinary variation in reluctance existing in successive test specimens of the same general character will not modify the magneto-motive force drop except in a very small degree. This makes it possible to subject the objects tested in successive tests to a practically constant magnetic potential difference, without altering the magnetizing current, which is obviously conducive to uniform results.

A second advantage, due to the maintenance of a practically uniform magnetic potential difference in successive tests, is had from the fact that the magnetic leakage conditions in the different tests remain practically constant. A third advantage had with the gap or gaps in the magnetic core, is due to the fact that a pole is formed at each gap end at the instant at which the magnetizing circuit is broken. These poles act in a manner tending to demagnetize both the core of the apparatus proper and the test and standard pieces, thereby lowering the time constant of the magnetic circuit and permitting the use of an indicator of low time constant. A fourth advantage of the provision of a gap or gaps in the magnetic core is due to the fact that it minimizes the effect of poor contact of either the test or standard piece, or both, by reason of scale or rust on such pieces, since the added reluctance due to such poor contact is but a small part of the total reluctance present. A fifth advantage of the provision of the gap or gaps in the magnetic core is due to the fact that it renders the magnetic quality of the material entering into the construction of the core of minor importance, so that it is possible to construct a number of cores of material which varies slightly in permeability and yet obtain practically uniform results under the same magneto-motive force conditions.

Preferably I employ a single gap located centrally in the cross-bar A, as shown in Figs. 1 and 3 since this is the most advantageous position to control leakage and to provide a higher effective magneto-motive force near the pole shoes than at the center of the test or standard bar, so as to compensate for the reluctance due to necessarily imperfect contact at such shoes and to make the flux in the test and standard pieces more uniform. I may also employ in addition, to, or in lieu of, the gap in the cross-bar A, gaps or non-magnetic spacers, such as brass, Y, between the test and standard pieces and the pole shoes, as shown in Fig. 6. The gaps Y assist in producing uniform flux conditions in the standard and test specimens, and in addition tend to render negligible the effect of unequal conditions of contact in the two branches of the magnetic circuit.

When it is desired to have the common core portion A of high reluctance in order to subject the standard and test pieces to a constant magnetic potential difference in successive tests, but it is undesirable to bring about the high reluctance by means of a non-magnetic spacer on account of the resultant leakage. I may make the central core portion A of material of high reluctivity, or if made of material of low reluctivity so proportion it that it is worked magnetically under conditions approaching saturation.

It is apparent that instead of simultaneously and directly comparing the magnetic characteristics of the standard and test pieces S and X as illustrated in Fig. 1 for instance, an indirect comparison of the magnetic characteristics of the two pieces may be obtained with the apparatus shown in Fig. 1 by taking readings of the instrument H with first one and then the second only of the pieces S and T in place.

With one air gap only bridged, however, the quantity measured by the instrument H is much larger and the sensitiveness of the apparatus correspondingly less than when both air gaps are bridged as shown in Fig. 1. This may be compensated for, however, as shown in Fig. 7 by the use of a variable mutual inductance in place of the standard piece. As shown in Fig. 7 the primary of the mutual inductance M is connected in series with the magnetizing coil C. The secondary of the mutual inductance M is connected in series with the coils D' and D². In the use of the mutual inductance M the latter is so adjusted that the flux change through the secondary coil due to a reversal of the current in its primary coil produces an integrated electro-motive force in the secondary coil which is equal to the integrated electro-motive force which would be induced in a test coil having a number of turns equal to the sum of the number of turns in the coils D' and D² if it were uniformly wound on the standard bar S under the conditions shown in Fig. 1. The coils D' and D² and the secondary of the mutual inductance are connected in series in such a manner that the sum of their integrated electro-motive forces opposes the electro-motive force generated at the same time in the coils D³ and D⁴.

By using a variable mutual inductance in place of a standard piece a number of advantages are gained. First, instead of requiring a standard specimen of the same composition and size as the test specimens, the test specimens may be compared to a fixed standard of flux change. Second, the mutual inductance being variable, it may be calibrated and adjusted so that its setting in any particular test will take into account the area of the test specimen.

In the use of the various forms of apparatus described herein there will be in addition to the flux passing through the two magnetic circuits including the free or polar ends of the core arms B and the common core A which the core is shaped to provide, a leakage flux between the arms B B which does not follow either of these circuits in its entirety.

The articles which can be tested by use of apparatus of the character described vary greatly, and as I have already indicated the character of the apparatus depends to some extent upon the characteristics of the article to be tested and compared. Standard and test leaf springs may readily be compared with the apparatus shown in Fig. 1. The apparatus shown in Fig. 8 is particularly adapted for testing complete helical springs. In the construction shown in this figure each pole piece $B^4$ is formed with a threaded socket coaxial with the corresponding socket of the coöperating pole piece. In each threaded socket is mounted a threaded rod $B^5$ provided at its lower inner end with a cup-shaped pole piece proper $B^6$, receiving the corresponding end of the test or standard spring $X^2$ or $S^2$ respectively.

The apparatus disclosed herein while novel with me and useful for many purposes is not claimed herein, but is claimed in my co-pending application, Serial No. 894 filed January 7, 1915. Said co-pending application is to be regarded in part as a division of this application, although the apparatus specifically disclosed therein advantageously differs in some respects from the apparatus disclosed herein.

While in accordance with the provisions of the statute I have disclosed and explained the best forms of my invention now known to me, it will be apparent to those skilled in the art that changes may be made in the modes of operation and forms of apparatus disclosed without departing from the spirit of my invention, and that certain features of the invention may sometimes be used without a corresponding use of other features.

Having now described my invention, what I claim as new and desire to secure by Letters Patent is,

1. The method of determining the effect of heat treatment on a metallic magnetic material which consists in simultaneously subjecting two specimens of said material of practically the same shape but differing from one another in the heat treatments which they have received, to the effects of the same changing magneto-motive force and measuring the differential of the induction through the two specimens when the magneto-motive force is changed.

2. The method of determining the effect of a heat treatment on a metallic magnetic material which consists in electro-magnetically comparing one specimen of said material which has been subjected to said heat treatment with another specimen of said material of practically the same shape but which is in a thoroughly annealed condition by simultaneously subjecting the two specimens to the effects of the same changing magneto-motive force and measuring the differential of the induction through the two specimens when the magneto-motive force is changed.

3. The method of determining the magnetic properties of a magnetic object which consists in utilizing a changing magneto-motive force to create a changing magnetic flux, passing one portion of said flux through said object and diverting another portion of said flux away from said object and measuring the differential inductive effects of said flux portions when said magneto-motive force is changed.

FRANK P. FAHY.

Witnesses:
 ELIZA TONKS,
 ROBERT S. STUNZ.